US008064083B2

(12) United States Patent
Perry et al.

(10) Patent No.: US 8,064,083 B2
(45) Date of Patent: Nov. 22, 2011

(54) PAD PRINTING USER INTERFACE DIALOG FOR COPY OR PRINT

(75) Inventors: Thomas J. Perry, Fairport, NY (US); James J. Dombrowski, Webster, NY (US); Robert I. Jacobs, Fairport, NY (US); Albert L. O'Neil, III, Rochester, NY (US); Mustapha Guesmia, Rochester, NY (US); Raju Seetharam, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 1240 days.

(21) Appl. No.: 11/742,146

(22) Filed: Apr. 30, 2007

(65) Prior Publication Data

US 2008/0266590 A1 Oct. 30, 2008

(51) Int. Cl.
*G06F 3/12* (2006.01)

(52) U.S. Cl. ....... 358/1.15; 358/1.1; 358/1.13; 715/700; 382/311

(58) Field of Classification Search ........................ None
See application file for complete search history.

(56) References Cited

U.S. PATENT DOCUMENTS

| | | | | |
|---|---|---|---|---|
| 5,007,625 A * | 4/1991 | Kremers et al. | ........... | 270/58.01 |
| 5,450,571 A * | 9/1995 | Rosekrans et al. | .............. | 703/24 |
| 5,805,297 A * | 9/1998 | Furuya et al. | ................. | 358/400 |
| 6,857,796 B2 * | 2/2005 | Hatayama | ....................... | 400/61 |
| 7,206,083 B2 * | 4/2007 | Shimada | ...................... | 358/1.14 |
| 2002/0025085 A1 * | 2/2002 | Gustafson et al. | ............ | 382/311 |
| 2004/0060010 A1 * | 3/2004 | Bright et al. | .................. | 715/526 |
| 2004/0187073 A1 * | 9/2004 | Tuijn et al. | .................... | 715/500 |
| 2004/0190042 A1 * | 9/2004 | Ferlitsch et al. | ............. | 358/1.15 |
| 2005/0235846 A1 * | 10/2005 | Ebisawa et al. | ........... | 101/128.4 |

OTHER PUBLICATIONS

U.S. Appl. No. 11/643,474, filed Dec. 21, 2006 in the name of Morales et al.

* cited by examiner

*Primary Examiner* — Sudhanshu Pathak
*Assistant Examiner* — Miya J Cato
(74) *Attorney, Agent, or Firm* — Oliff & Berridge, PLC

(57) ABSTRACT

A method and graphical user interface for selecting pad printing functions for an image output device. The user interface is provided to a user and displays a pad printing dialog box that enables selection of pad printing output. Selectable pad printing options are displayed, which include the number of sheets per pad and the total number of pads to be output. When the user selection of pad printing and pad printing options are received, the total quantity of sheets to be output based on selected pad printing options and organizing the sheets for pad printing output from the image output device are automatically determined. Availability of pad printing is determined based on finishing options selected.

17 Claims, 10 Drawing Sheets

| EXEMPLARY MODEL 1 OPTIONS | | | |
|---|---|---|---|
| STAPLING / FINISHING SELECTION | SUBSET FINISHING | SUBSET OFFSET | PAD PRINTING |
| NONE | INACTIVE | ACTIVE | ACTIVE |
| 1 STAPLE OPTIONS | ACTIVE | INACTIVE UNTIL FINISHING TOGGLED ON | INACTIVE UNTIL FINISHING TOGGLED ON |
| 2 STAPLE OPTIONS | ACTIVE | INACTIVE UNTIL FINISHING TOGGLED ON | INACTIVE UNTIL FINISHING TOGGLED ON |
| Z-FOLD (SINGLE SHEET) | INACTIVE | INACTIVE | INACTIVE |
| C-FOLD (SINGLE SHEET) | INACTIVE | INACTIVE | INACTIVE |
| BI-FOLD (MULTIPLE SHEET) | ACTIVE | INACTIVE UNTIL FINISHING TOGGLED ON | INACTIVE UNTIL FINISHING TOGGLED ON |
| DFA DEVICE | ACTIVE | INACTIVE | INACTIVE UNTIL FINISHING TOGGLED ON |
| EXEMPLARY MODEL 2 OPTIONS | | | |
| STAPLING / FINISHING SELECTION | SUBSET FINISHING | SUBSET OFFSET | PAD PRINTING |
| NONE | INACTIVE | ACTIVE | ACTIVE |
| 1 STAPLE OPTIONS | ACTIVE | INACTIVE UNTIL FINISHING TOGGLED ON | INACTIVE UNTIL FINISHING TOGGLED ON |
| 2 STAPLE OPTIONS | ACTIVE | INACTIVE UNTIL FINISHING TOGGLED ON | INACTIVE UNTIL FINISHING TOGGLED ON |
| CENTER STAPLE | INACTIVE | INACTIVE UNTIL FINISHING TOGGLED ON | INACTIVE UNTIL FINISHING TOGGLED ON |
| HOLE PUNCH OPTIONS | INACTIVE | INACTIVE UNTIL FINISHING TOGGLED ON | INACTIVE UNTIL FINISHING TOGGLED ON |
| HALF-SHEET Z-FOLD OPTIONS | INACTIVE | INACTIVE UNTIL FINISHING TOGGLED ON | INACTIVE UNTIL FINISHING TOGGLED ON |
| Z-FOLD (SINGLE SHEET) | INACTIVE | INACTIVE | INACTIVE |
| C-FOLD (SINGLE SHEET) | INACTIVE | INACTIVE | INACTIVE |
| BI-FOLD (SINGLE SHEET) | INACTIVE | INACTIVE | INACTIVE |
| BI-FOLD (MULTIPLE SHEET) | ACTIVE | INACTIVE UNTIL FINISHING TOGGLED ON | INACTIVE UNTIL FINISHING TOGGLED ON |
| BI-FOLD & STAPLE (MULTIPLE SHEET) | ACTIVE | INACTIVE UNTIL FINISHING TOGGLED ON | INACTIVE UNTIL FINISHING TOGGLED ON |
| MULTIPLE FINISHING | INACTIVE | INACTIVE UNTIL FINISHING TOGGLED ON | INACTIVE UNTIL FINISHING TOGGLED ON |

TO FIG. 9B

FIG. 9A

FROM FIG. 9A

| | | | |
|---|---|---|---|
| EXEMPLARY MODEL 3 OPTIONS | | | |
| STAPLING / FINISHING SELECTION | SUBSET FINISHING | SUBSET OFFSET | PAD PRINTING |
| NONE | INACTIVE | INACTIVE UNTIL STACKER IS SELECTED | ACTIVE |
| 1 STAPLE OPTIONS | ACTIVE | INACTIVE | INACTIVE UNTIL FINISHING TOGGLED ON |
| 2 STAPLE OPTIONS | ACTIVE | INACTIVE | INACTIVE UNTIL FINISHING TOGGLED ON |
| BINDING OPTIONS | ACTIVE | INACTIVE | INACTIVE UNTIL FINISHING TOGGLED ON |
| DFA DEVICE | ACTIVE | INACTIVE | INACTIVE UNTIL FINISHING TOGGLED ON |
| EXEMPLARY MODEL 4 OPTIONS | | | |
| STAPLING / FINISHING SELECTION | SUBSET FINISHING | SUBSET OFFSET | PAD PRINTING |
| NONE | INACTIVE | INACTIVE UNTIL UNCOLLATED AND STACKER SELECTED | ACTIVE |
| DFA DEVICE | ACTIVE | INACTIVE | INACTIVE UNTIL FINISHING TOGGLED ON |
| EXEMPLARY MODEL 5 OPTIONS | | | |
| STAPLING / FINISHING SELECTION | SUBSET FINISHING | SUBSET OFFSET | PAD PRINTING |
| NONE AVAILABLE AT ALL | INACTIVE | INACTIVE UNTIL STACKER SELECTED | ACTIVE |
| EXEMPLARY MODEL 6 OPTIONS | | | |
| STAPLING / FINISHING SELECTION | SUBSET FINISHING | SUBSET OFFSET | PAD PRINTING |
| NONE | INACTIVE | INACTIVE UNTIL STACKER / STAPLER SELECTED | ACTIVE |
| 1 STAPLE OPTIONS | ACTIVE | INACTIVE | INACTIVE UNTIL FINISHING TOGGLED ON |
| 2 STAPLE OPTIONS | ACTIVE | INACTIVE | INACTIVE UNTIL FINISHING TOGGLED ON |
| DFA DEVICE | ACTIVE | INACTIVE | INACTIVE UNTIL FINISHING TOGGLED ON |
| EXEMPLARY MODEL 7 OPTIONS | | | |
| STAPLING / FINISHING SELECTION | SUBSET FINISHING | SUBSET OFFSET | PAD PRINTING |
| NONE AVAILABLE AT ALL | INACTIVE | INACTIVE UNTIL UNCOLLATED AND STACKER SELECTED | ACTIVE |
| DFA DEVICE | ACTIVE | INACTIVE | INACTIVE UNTIL FINISHING TOGGLED ON |

FIG. 9B

PAD PRINTING USER INTERFACE DIALOG FOR COPY OR PRINT

BACKGROUND

This disclosure relates to systems and methods that provide a user interface enabling job programming for the printing of pads, where multiple copies of one or more printed sheets of paper are organized and output to be bound to a heavier stock or cardboard backing.

Pads are typically a group of single sheet forms, often with a card stock back cover and a glue binding on the top edge. Forms can then be torn off when needed from the pad. Pad creation typically has proceeded as follows: The single sheet forms are printed as an uncollated job. The operator has to calculate and program the desired quantity, i.e., by multiplying the number of sheets per pad by the number of pads needed. To facilitate post-printing assembly with a card stock cover for each pad, the operator also programs subset offset and glue binds each of the assembled pads. This process is largely manual and requires offline finishing. The required calculations and programming of multiple features have a high potential for error.

Efficient pad printing programming has presented a challenge to digital publishing and printing workflow. Examples of such attempts can be found in U.S. patent application Ser. No. 11/643,474 to Morales et al., the disclosure of which is hereby incorporated herein by reference in its entirety. The current solutions on the market enable pad printing in either a very inefficient manner or a very inelegant manner. For example, current solutions oftentimes involve a printed form and copying the pages manually, separating the pages and then adding a back cover all manually.

SUMMARY

Aspects of the disclosure provide pad printing as a special subset finishing option of printers to facilitate programming for printing pads. In exemplary embodiments, the input for the sheet forms can be either via an electronic file or scanned originals. An operator selects the pad printing option via a printer user interface and enters the number of sheets per pad and the number of pads to produce. The operator may optionally select a back cover option and then may select specific stock for the back cover. Based on this input, the system automatically sets the quantity to print and selects uncollated output. If the printer supports subset offset or subset finishing, the operator can also program offset and/or finishing of each pad. Methods and systems according to aspects of the disclosure can simplify the user interface dialog for programming pad jobs, eliminate the need for operator calculations, and automate the assembly of the sheet forms along with the back cover. This can eliminate the need for offline assembly and finishing.

Exemplary methods and systems of the disclosure provide a user interface for the programming of print jobs that enable selection of pad printing options and generation of output sheet forms and covers organized and assembled for efficient creation of pads. In accordance with certain aspects of the disclosure, pad printing functionality is incorporated into a user interface for display with other output options so that pad printing programming can be simplified by having all outputting options available on a same user interface screen.

In exemplary embodiments, a subset finishing option is provided on a user interface that allows for pad printing. When pad printing is selected, the user is prompted to enter the number of sheets per pad and the number of total pads to produce. Optionally, a back cover option and cover stock are selected. The system then may automatically set the quantity to print (number of sheets per pad times the total number of pads) and select uncollated output.

An exemplary method for selecting pad printing functions for an image output device includes providing a user interface to a user that displays a pad printing dialog box that enables selection of pad printing output; displaying selectable pad printing options, including the number of sheets per pad and the total number of pads to be output; receiving user selection of pad printing and pad printing options; automatically determining the total quantity of sheets to be output based on selected pad printing options; and organizing the sheets for pad printing output from the image output device.

An exemplary embodiment of the disclosure provides a graphical user interface for selecting pad printing functions in an image output device. The graphical user interface includes a pad printing dialog box that allows user selection of a pad printing function and selection of pad printing values. A back cover dialog box allows user selection of whether to output a back cover, and a print initiation button initiates the outputting of finished pads from the image output device. The pad printing values includes the selection of the number of sheets per pad and the number of pads to be produced.

These and other features are described in, or are apparent from, the following detailed description of various exemplary embodiments.

BRIEF DESCRIPTIONS OF THE DRAWINGS

Exemplary embodiments will be further described with reference to the following drawings wherein:

FIG. 9A is a list of exemplary options; and

FIG. 9B is an additional list of exemplary options.

EMBODIMENTS

An exemplary embodiment of an image output device 152 capable of performing pad printing, such as a printer, will be described with reference to FIGS. 1-2. The word "printer" as used herein encompasses any apparatus, such as a digital copier, bookmaking machine, facsimile machine, multi-function machine, etc. that performs a print outputting function for any purpose. Image output device 152 preferably includes an image processor 154 that forms a user interface for display of selectable printer options.

Figure 2:
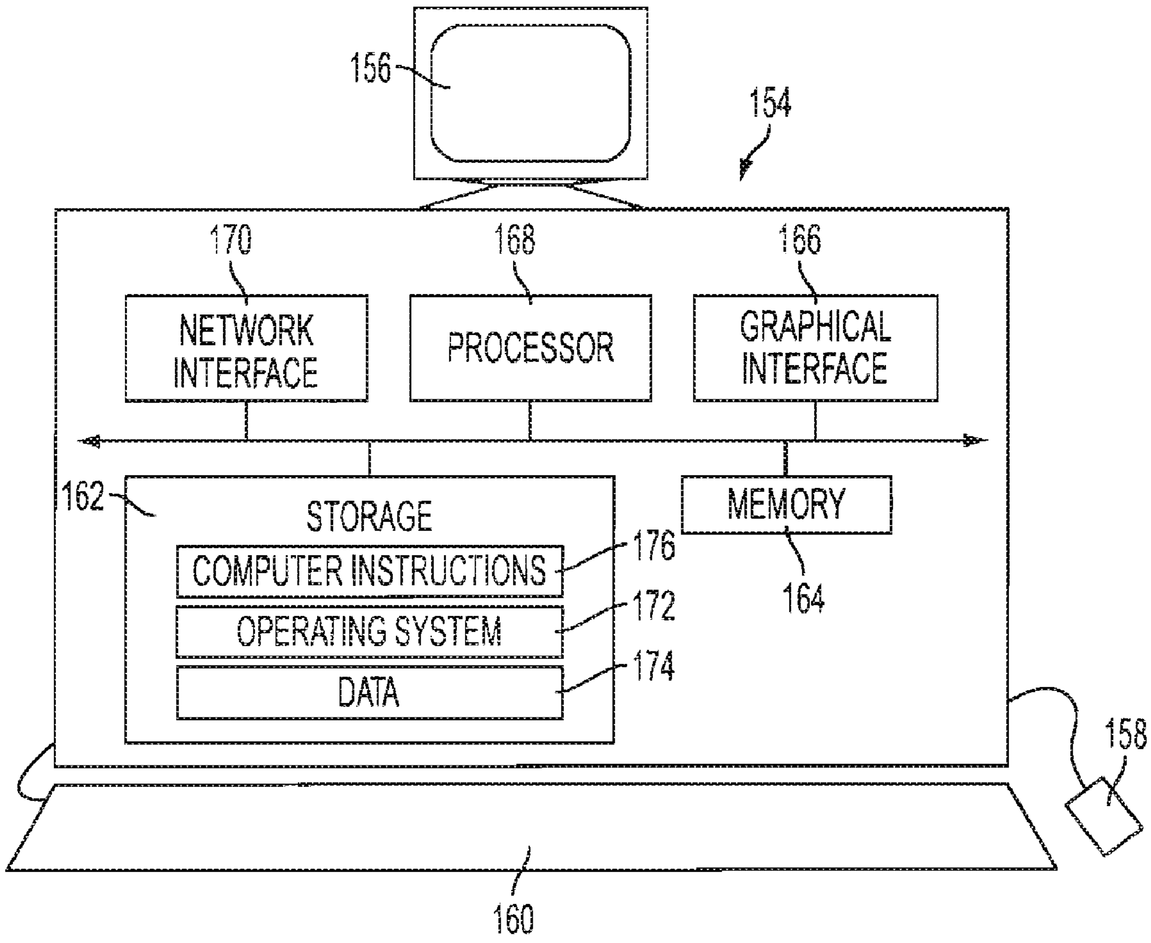
FIG. 2 is a functional block diagram illustrating an exemplary image processing device.

FIG. 2 shows an mage processor 154 for enabling operation of the image output device 152 through a user interface displayed on display screen 156. Image processor 154 may include a network interface card 170 for connecting to a Local Area Network (LAN), a processor 168, a graphical user interface 166 (provided on display 156), RAM or memory 164, and a storage device 162. Storage device 162 can take conventional forms and stores computer instructions 176, an operating system 172, and various data 174. The image processor 154 may also include a mouse 158, keyboard 160, touch screen, or other suitable input device for inputting and selecting information by a user to control operation of image output device 152.

Figure 1:
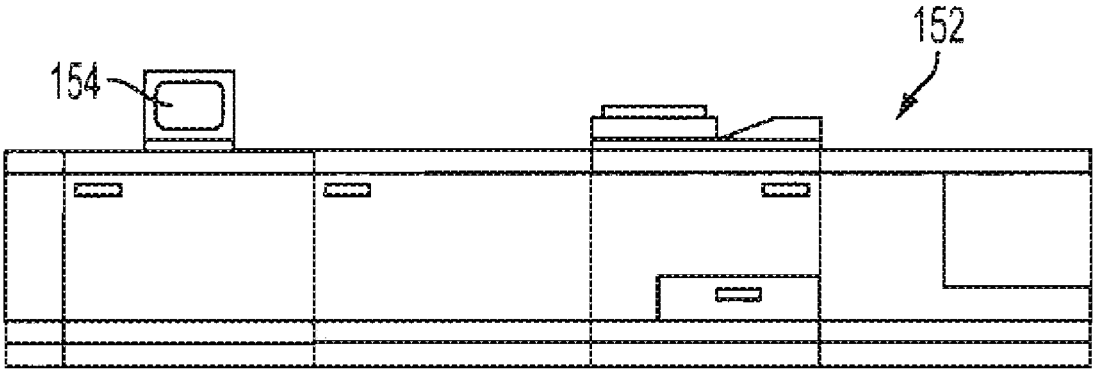
FIG. 1 is an illustration of an exemplary image output device having pad printing functionality.

Appropriate portions of the image output device 152 of FIG. 1 and the image processor 154 of FIG. 2 are preferably implemented either on a single program general purpose computer or separate programmed general purpose computer. However, the image output device 152 and the image processor 154 can also be implemented on a special purpose computer, a programmed micro-processor or micro-controller and peripheral integrated circuit element, an ASIC or other integrated circuit, a digital signal processor, a hard-wired electronic or logic circuit such as a discrete element circuit, a programmable logic device such as a PLD, PLA, FPGA, PAL, or the like. In general, any device capable of implementing a finite state machine that is in turn capable of implementing the flowchart shown in FIG. 3, or appropriate portions thereof, can be used.

Furthermore, disclosed methods may be readily implemented in software using object or object-oriented software development environments that provide portable source code that can be used on a variety of computer or workstation hardware platforms. Alternatively, appropriate portions of the disclosed image output system 152 and the image processor 154 may be implemented partially or fully in hardware using standard logic circuits or a VLSI design. Whether software or hardware is used depends on the speed and/or efficiency requirements of the system, the particular function, and the particular software or hardware systems or microprocessor or microcomputer systems being utilized. The processing systems and methods described above, however, can be readily implemented in hardware or software using any known or later developed systems or structures, devices and/or software by those skilled in the applicable art without undue experimentation from the functional description provided herein together with a general knowledge of the computer arts.

Moreover, the disclosed methods may be readily implemented as software executed on a programmed general purpose computer, a special purpose computer, a micro-processor, or the like. In this case, the above-described methods and systems can be implemented as a routine embedded on a personal computer or as a resource residing on a server or workstation, such as a routine embedded in a photocopier, a color photocopier, a printer driver, a scanner, or the like. The systems and methods can also be implemented by physical incorporation into a software and/or hardware system, such as the hardware and software system of a photocopier or a dedicated image processing system.

Figure 3:
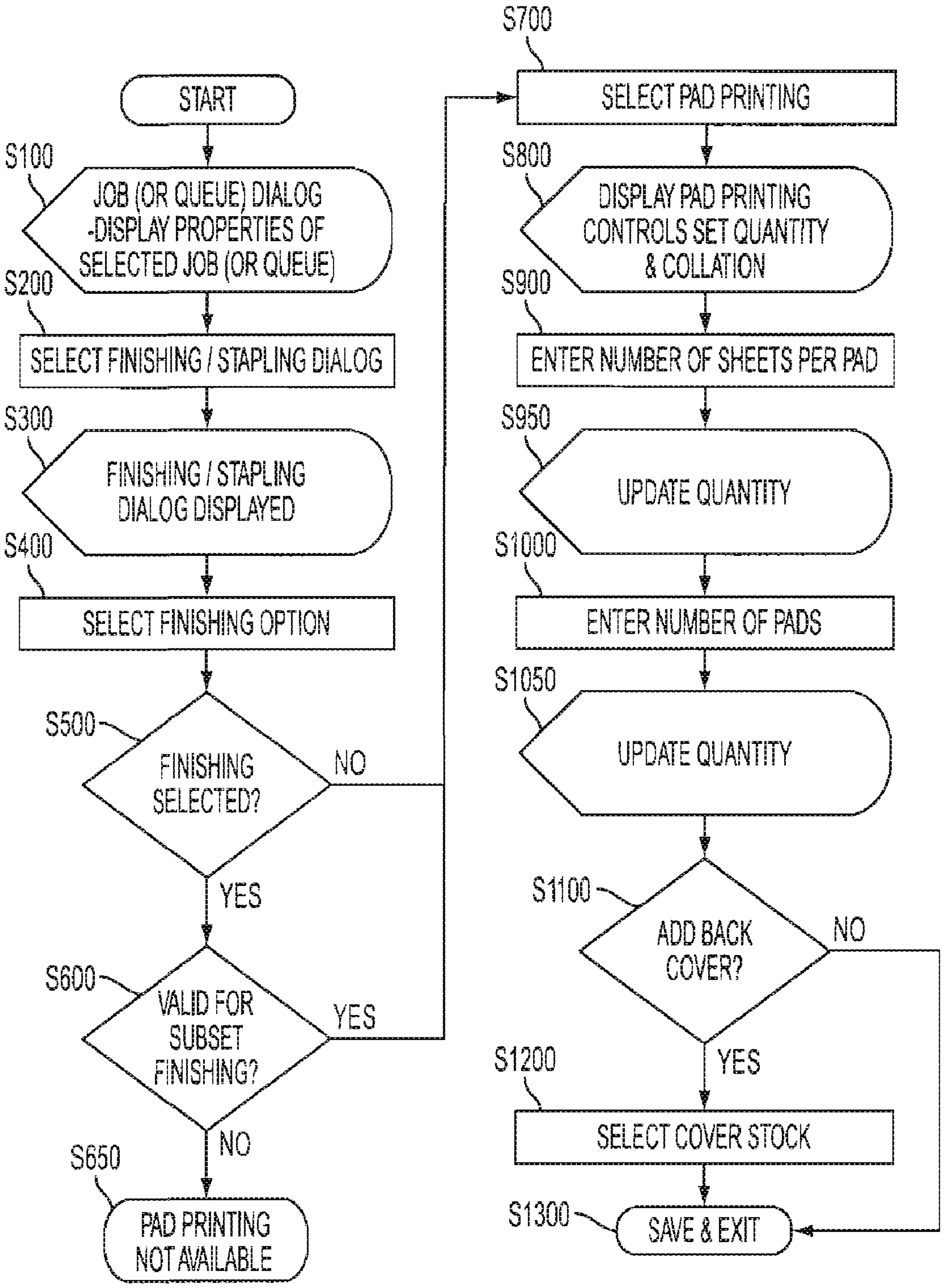
FIG. 3 is a flow chart illustrating an exemplary method for selecting pad printing functions for an image output device.
Figure 4:
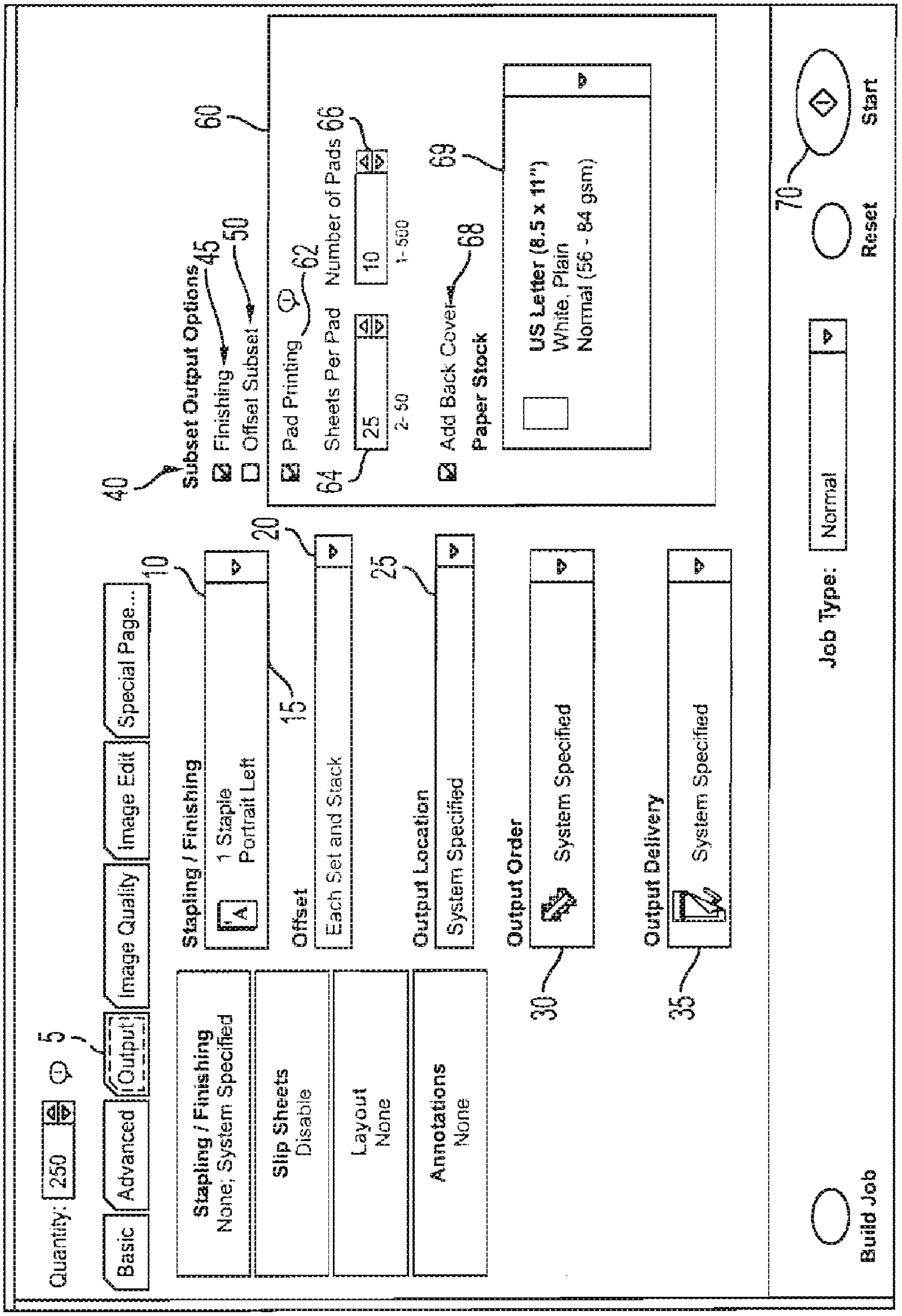
FIG. 4 shows an exemplary user interface screen for selecting pad printing functions.

FIG. 3 is a flowchart illustrating an exemplary method for selecting pad printing functions on an image output device. The method starts at step S100 where a job dialog box or queue dialog box may be presented on a user interface, such as being presented on display 156. The job dialog box may display various categories of functions that can be selected to be performed by the image output device 152, such as output options shown in the exemplary user interface screen shown in FIG. 4. One such output option is stapling/finishing. The default may be no stapling or finishing. However, if different stapling/finishing options are desired, the user may select a finishing/stapling dialog icon at step S200, upon which a detailed finishing/stapling dialog box may be displayed at step S300. The finishing/stapling dialog box can enable selection of one or more stapling/finishing options at step S400, such as stapling of the left corner as shown in FIG. 4.

Upon completion of the finishing option selection, the method at step S500 determines whether finishing is selected from the finishing/stapling dialog box. If no finishing options are selected, pad printing is possible and the method enables selection of a pad printing function at step S700. However, if finishing options are selected, then the method advances to step S600 and determines whether the job is valid for subset finishing. Exemplary combinations of finishing options and the availability of pad printing, subset finishing and subset offset are provided in FIGS. 9A and 9B. If the job is not valid for subset finishing, then it is determined that pad printing is not available and the method at step S650 prevents the user interface from enabling pad printing. However, if the job is valid for subset finishing then the method advances to step S700 and enables selection of the pad printing selection box. An exemplary pad printing dialog box 60 is shown in FIG. 4. If the pad printing selection box is selected, an user interface displaying pad printing controls and other parameters may be displayed at step S800. An example of such a user interface display is shown in FIG. 4 and includes selectable options for sheets per pad, number of pads, whether a back cover is desired, and selection of a particular back cover.

The user interface may allow a user to enter specific pad printing options such as, for example, entering of the number of sheets per pad at step S900 and updating the quantity on the display at step S950 and also entering the number of pads at step S1000 and updating of the quantity of pads at step S1050. At step S1100 it is determined whether a back cover selection box has been selected. If the back cover selection box is selected, then a back cover dialog box may be displayed as shown in FIG. 4 to allow selection of a suitable cover stock at step S1200. The cover stock can take various forms and may include, for example, card stock similar to that used for backing on a conventional pad of paper, or may be plain paper or any other type of cover stock, for example, pre-printed, recycled, pre-cut tabs, drilled, etc. Upon completion of the selection, the method advances to step S1300 where the various settings are saved. After the job is printed out, the job may be sent to a finishing apparatus, such as to glue bind the output.

The method is extendible to the submission of Pad Printing jobs via clients and print drivers. Moreover, pad printing may be used for one-sided or two-sided forms in which a print job may have one image if printed on one-side of the sheet (simplex) and two images if printed on two-sides of the sheet (duplex). The method is extensible to multipart forms of arbitrary length, for example, with addition of an entry for the number of images per form. The method may include an optional front cover. Additionally, the Pad Printing jobs may be saved, reprinted and forwarded.

FIG. 4. shows an exemplary embodiment of an output dialog box 5 which may also contain a subset output options section. As can be seen, this provides a user interface where all output options can be selected on a common interface screen, including stapling/finishing dialog box 10, offset dialog box 20, output location dialog box 25, output order dialog box 30, output delivery dialog box 35, and subset output options dialog box 40, which includes an offset subset dialog box 50 and pad printing dialog box 60. The finish/stapling dialog box 10 may show a variety of finishing options. Finishing may be defined as any post-printing operation on the output Examples include, 1 staple portrait left, 2 staple option, various folding operations, such as bi-fold, Z-fold and C-fold finishing options, 3 hole punch, glue binding, comb binding, spiral binding and other sorts of binding. Finishing may also include trimming or slitting as known. In certain embodiments, pad printing may not be available when incompatible finishing options are selected, such as when the Z-fold or the C-fold options are selected. The start button or print button 70 may be used to initiate the pad printing process and serves as a print initiation button.

The offset dialog box 10 contains offset options and may be separate from the subset offset. The offset control allows the offsetting of each complete copy set of a job by a specified lateral offset from the previous set. The offset option may simplify the separation of copy sets.

The offset subset checkbox 50 refers to the subset of a full copy set job. A subset is something smaller than a complete copy set. Various subsets may be offset similar to that defined above. Output location dialog box 25 allows user selection of the output location. The output location may refer to the specific output tray of the image output device such as, for example, the top tray. This feature may have a default system configuration that can be overridden by user selection. In certain embodiments, all of the features of the image output device may not be available for certain output locations. Accordingly, depending of features selected, one or more output locations may be disabled for user selection.

Output order dialog box 30 allows user selection of output order, such as whether the first page of a print job is printed first and then the output is sequentially printed until the last page is printed, or whether the last page is printed first and the first page is printed last. Output delivery dialog box 35 allows user selection of whether the job is output face up or face down. The output delivery and output order dialog boxes 35 and 30 may allow all options concerning output delivery and output order. The logic may include some nonsensical choices because the output may be processed afterwards by an offline finishing device. In certain exemplary embodiments, however, the output delivery and output order dialog boxes may allow only certain combinations concerning output delivery and output order. The logic may restrict the selection of non-sensical choices.

In an exemplary embodiment, the subset output option may allow pad printing when there is no finishing option selected. The subset output options area may display a different screen when pad printing is selected. The pad printing screen may allow the selection of the number of sheets per pad, the number of pads, the option to select a back cover and glue binding the binder.

Figure 5A:
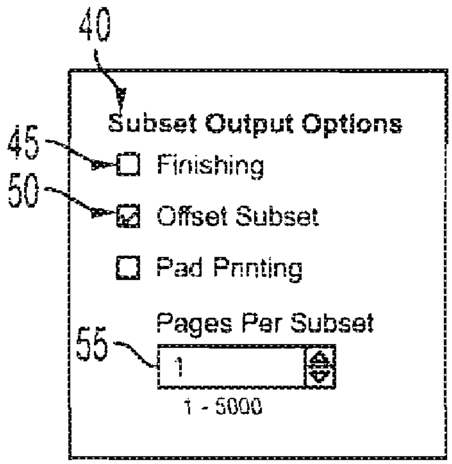
FIG. 5A shows an exemplary detailed user interface screen portion of FIG. 4 that enables selection of pad printing functionality.
Figure 5B:
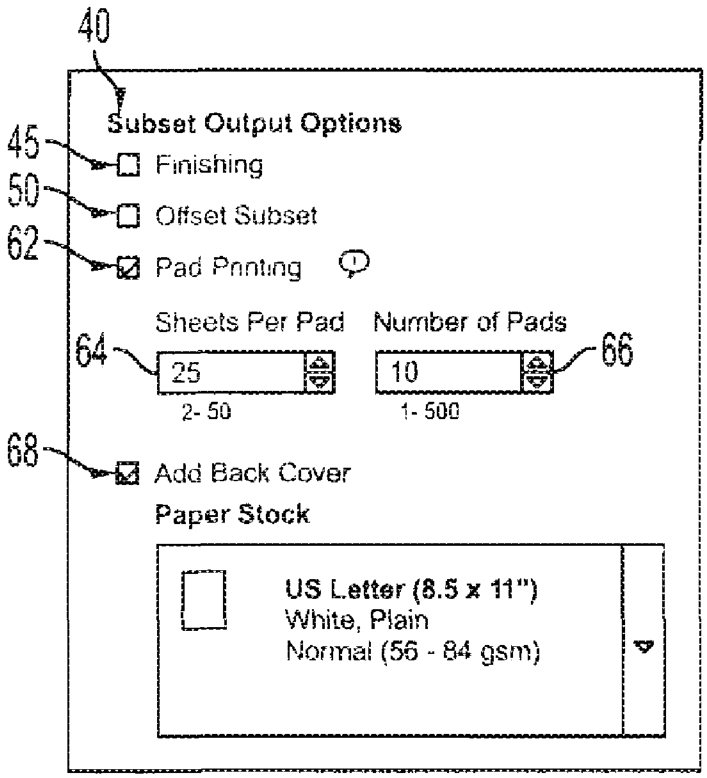
FIG. 5B shows an exemplary detailed user interface screen portion after pad printing has been enabled by toggling on of the pad printing icon and in which additional functionality options are presented on the user interface for selection.

The Subset Options Output screen 40 shows a Finishing check box 45, an Offset Subset checkbox 50 and a Pad Printing checkbox 62 as shown in FIG. 5A. In an exemplary embodiment, when stapling/finishing is set to none or no finishing, Pad Printing is available. In this example, Offset Subset may be either on or off. In another exemplary embodiment, when stapling/finishing is not set to none or no finishing, the Pages Per Subset spin box 55 may be shown. The Pages Per Subset spin box 55 sets the number of pages per subset. When Pad Printing 62 is selected and Offset Subset is either selected or not selected, the additional pad printing options may appear as shown in FIG. 5B. Pad Printing offers the option to select sheets per pad 64, number of pads 66 and the ability to add a back cover. When the add back cover check box 68 is selected, paper stock may be chosen. In an exemplary embodiment, the Paper Stock selection box is inactive when Add Back Cover is not selected. When Pad Printing is toggled off, the controls are reverted to a prior state and the extra controls for Pad Printing may be hidden.

Figure 6A:
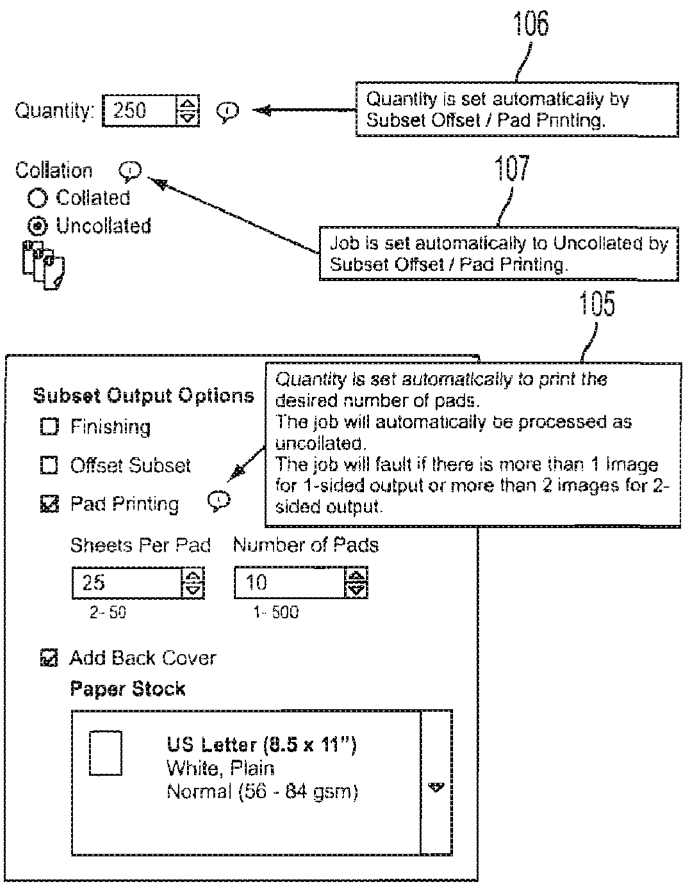
FIG. 6A shows the user interface screen of FIG. 5B upon toggling on of an information icon.
Figure 6B:
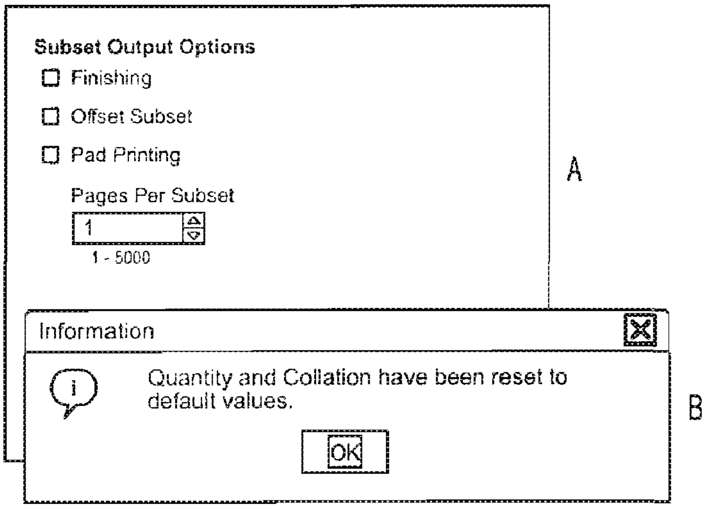
FIG. 6B shows the user interface screen of FIG. 6A upon toggling off of the pad printing option in which a reset alert box is displayed.

When items are selected, little information icons 105, 106 and 107 may appear to explain what actions were performed as shown in FIG. 6A. For example, when pad printing is selected, an information icon 105 may appear to explain that the quantity is automatically set, the output may be uncollated and the job may fault if you have more than one image for one-sided output or more than two images for two sided output. Furthermore, if the pad printing selection dialog box is deselected from the subset output options screen A, the quantity and collation may be reset back to default value B, which may be, for example, one for quantity and collated as shown in FIG. 6B. However, the defaults may be changed.

Figure 7:
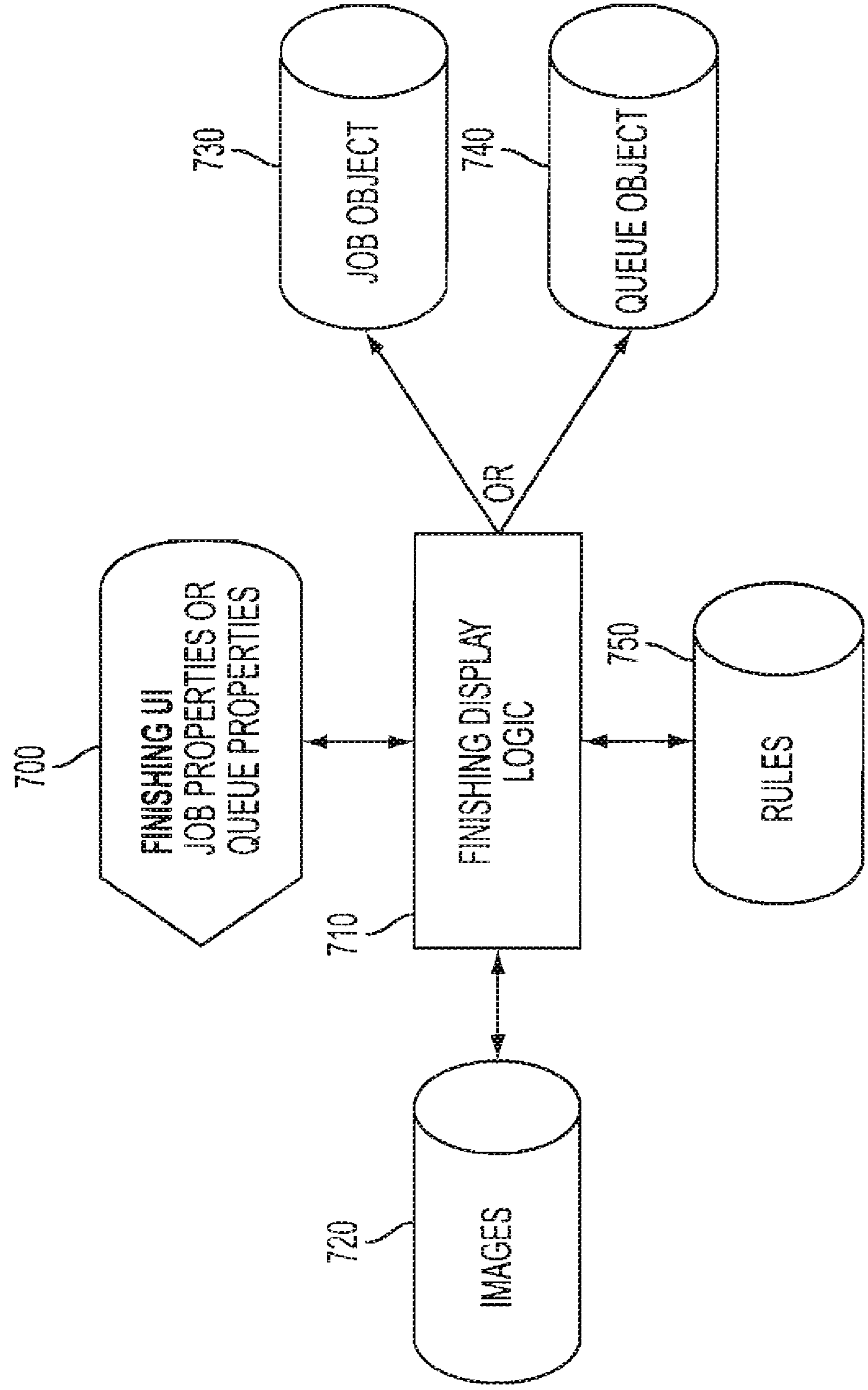
FIG. 7 is a block diagram illustrating user interface dialog for pad printing.

An exemplary embodiment of a block diagram for selecting pad printing functions is shown in FIG. 7. An end user may review the job or queue properties from a finishing user interface 700. There may be multiple jobs and/or multiple queues. A pad printing queue may be set up specifically for pad printing. A job may be copied or scanned in and pads may be output from the queue. The finishing display logic 710 may interact with the finishing user interface and incorporate images 720 from a storage location to bring up different finishing user interfaces. The finishing display logic 710 may also interact with the rules 750 to determine how to react to different scenarios. Lastly, the finishing display logic 710 may interact with the job object 730 or queue object 740.

Figure 8:
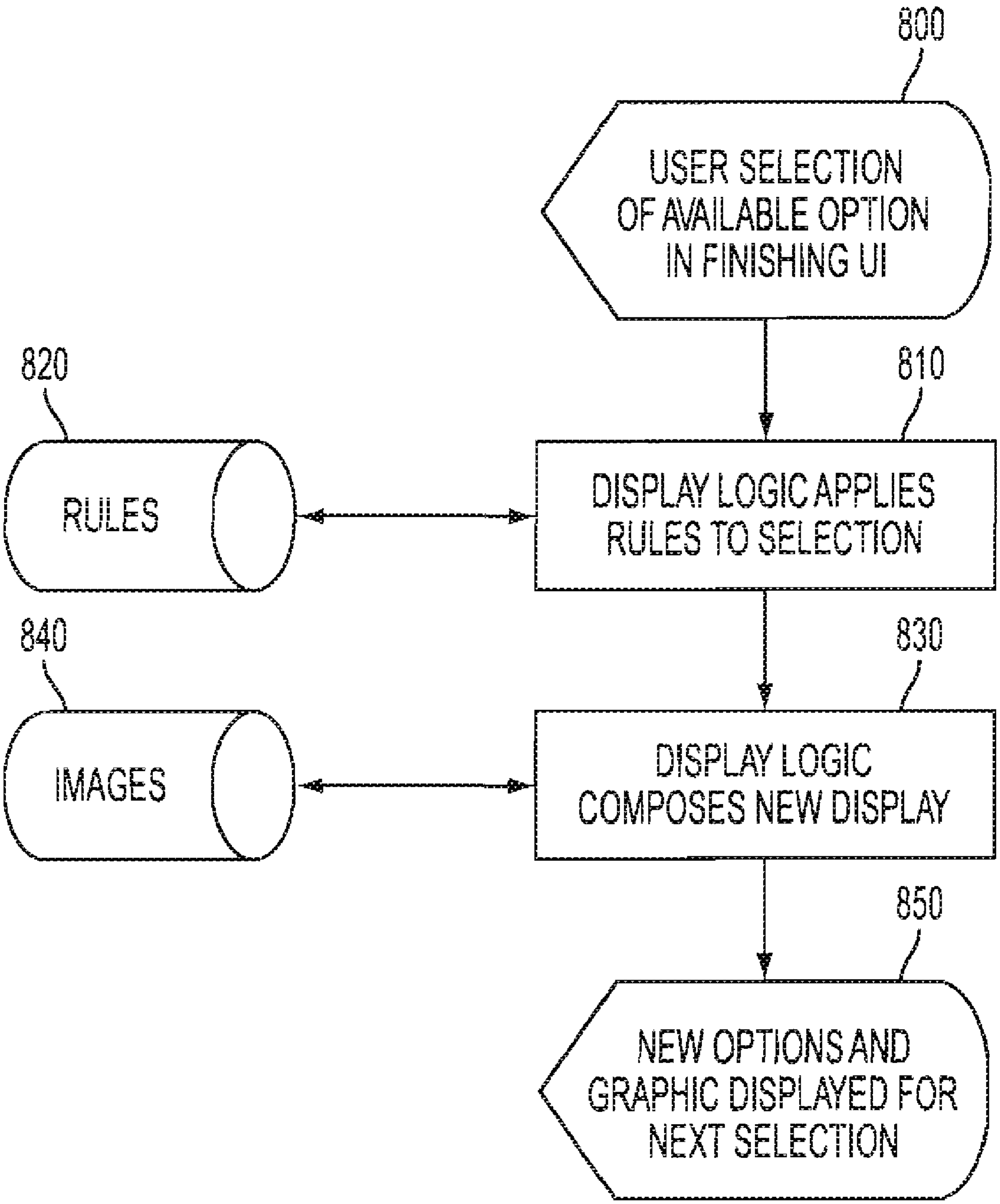
FIG. 8 is a flow chart illustrating user interface display dialog.

The pad printing options are based on the interaction detail for the pad printing user interface selection options as shown in FIG. 8. The user selection of available options occurs in the finishing UI as shown in 800. After the pad printing options are selected, the display logic applies rules 820 to the selection as shown in 810. The display logic selection then gathers images 840 based on the selection options to create the new user interface as shown in 830. Afterwards, new options and graphics are displayed on the pad printing options for the next selection as shown in 850.

It will be appreciated that various of the above-disclosed and other features and functions, or alternatives there of, may be desirably combined into many unanticipated alternatives, modifications, variations or improvements therein may be subsequently made by those skilled in the art, and are also intended to be encompassed by the following claims.

What is claimed is:

1. A method for selecting pad printing functions for an image output device comprising:

providing a user interface to a user that displays a pad printing dialog box that enables selection of pad printing output;

displaying selectable pad printing options, including a number of sheets per pad and a total number of pads to be output;

receiving user selection of pad printing and pad printing options, wherein a subset output options dialog box includes a finishing dialog box and an offset subset dialog box, and pad printing is always available when a finishing value from the finishing dialog box is not selected and when a selected finishing value from the finishing dialog box is compatible with a selected offset subset value from the offset subset dialog box;

automatically determining a total quantity of sheets to be output based on selected pad printing options; and organizing the total quantity of sheets output from the image output device based on the selected pad printing options.

2. The method of claim 1, wherein the pad printing dialog box is displayed along with at least one other output dialog box that provides user selection of an output option.

3. The method of claim 2, wherein the at least one other output dialog box is selected from the group of the finishing dialog box, an offset dialog box, an output location dialog box, an output order dialog box, and an output delivery dialog box.

4. The method of claim 1, wherein the subset output options dialog box includes the pad printing dialog box.

5. The method of claim 1, wherein displaying selectable pad printing options includes display of a back cover dialog box that enables user selection of a back cover.

6. The method of claim 5, further comprising display of a back cover stock dialog box that allows user selection of a back cover stock.

7. The method of claim 6, further comprising providing the organized sheets from the image output device to a finishing station.

8. The method of claim 7, wherein the finishing station performs glue binding of the organized sheets onto the back cover.

9. A device for selecting pad printing functions in an image output device comprising:

means for providing a user interface to a user that displays a pad printing dialog box that enables selection of pad printing output;

means for displaying selectable pad printing options, including a number of sheets per pad and a total number of pads to be output;

means for receiving user selection of pad printing and pad printing options, wherein a subset output options dialog box includes a finishing dialog box and an offset subset dialog box, and pad printing is always available when a finishing value from the finishing dialog box is not selected and when a selected finishing value from the finishing dialog box is compatible with a selected offset subset value from the offset subset dialog box;

means for automatically determining a total quantity of sheets to be output based on selected pad printing options; and means for organizing the total quantity of sheets output from the image output device based on the selected pad printing options.

10. A graphical user interface for selecting pad printing functions in an image output device comprising:

a pad printing dialog box that allows user selection of a pad printing function and selection of pad printing values, wherein the pad printing values include a selection of a number of sheets per pad and a number of pads to be produced, the pad printing dialog box is provided on a job output dialog box that includes at least one other output dialog box for user selection of output options, the job output dialog box includes a subset output options dialog box that includes a finishing option dialog box, an offset subset dialog box, and the pad printing dialog box, and pad printing is always available when a finishing value from the finishing option dialog box is not selected and when a selected finishing value from the finishing option dialog box is compatible with a selected offset subset value from the offset subset dialog box;

a back cover dialog box that allows user selection of whether to output a back cover; and a print initiation button to initiate the outputting of finished pads from the image output device based on the user selection.

11. The graphical user interface of claim 10, wherein the at least one other output dialog box includes a dialog box selected from the group of an offset dialog box, an output location dialog box, an output order dialog box, and an output delivery dialog box.

12. The graphical user interface of claim 10, wherein dialog boxes for selection of the pad printing values appear on the user interface upon selection of the pad printing dialog box.

13. The graphical user interface of claim 10, further comprising a back cover paper stock dialog box allowing user selection of a back cover paper stock.

14. The graphical user interface of claim 11, wherein the interface prevents outputting of finished pads based on a subset finishing value.

15. The graphical user interface of claim 10, wherein the interface enables outputting of finished pads to a finishing station.

16. The graphical user interface of claim 15, wherein the graphical user interface automatically updates the quantity of sheets to be output based on the pad printing values.

17. The graphical user interface of claim 10, wherein the pad printing dialog box includes at least one information icon to explain what actions will be performed.

* * * * *